(12) United States Patent
Kouno et al.

(10) Patent No.: US 9,501,113 B2
(45) Date of Patent: Nov. 22, 2016

(54) VOLTAGE DETECTION SYSTEM AND CONTROLLING METHOD OF THE SAME

(75) Inventors: Kyouhei Kouno, Kanagawa (JP);
Shinichi Nakatsu, Kanagawa (JP);
Kazuyo Yamaguchi, Kanagawa (JP);
Kimiharu Eto, Kanagawa (JP);
Kuniyasu Ishihara, Kanagawa (JP);
Hirotaka Shimoda, Kanagawa (JP);
Yuusuke Urakawa, Kanagawa (JP);
Seiya Indo, Kanagawa (JP)

(73) Assignee: RENESAS ELECTRONICS CORPORATION, Kanagawa (JP)

( * ) Notice: Subject to any disclaimer, the term of this patent is extended or adjusted under 35 U.S.C. 154(b) by 302 days.

(21) Appl. No.: 13/164,405

(22) Filed: Jun. 20, 2011

(65) Prior Publication Data
US 2011/0313700 A1    Dec. 22, 2011

(30) Foreign Application Priority Data
Jun. 21, 2010    (JP) ................................. 2010-140594

(51) Int. Cl.
*G01R 19/00* (2006.01)
*G06F 1/24* (2006.01)
*G06F 1/30* (2006.01)

(52) U.S. Cl.
CPC .. *G06F 1/24* (2013.01); *G06F 1/30* (2013.01)

(58) Field of Classification Search
CPC ..................................... G06F 1/30; G06F 1/24
USPC ............................ 702/64; 327/142, 143, 198
See application file for complete search history.

(56) References Cited

U.S. PATENT DOCUMENTS

| | | | | |
|---|---|---|---|---|
| 6,052,313 | A * | 4/2000 | Atsumi ................. | G11C 5/143 365/184 |
| 2001/0043493 | A1* | 11/2001 | Fujioka ................ | G06F 1/3203 365/189.09 |
| 2003/0107422 | A1* | 6/2003 | Miyagi ......................... | 327/215 |
| 2003/0154230 | A1 | 8/2003 | Harada et al. | |
| 2004/0012419 | A1* | 1/2004 | Kim et al. ................... | 327/143 |
| 2004/0073388 | A1* | 4/2004 | Dorny et al. ................. | 702/63 |
| 2004/0140842 | A1* | 7/2004 | Lee et al. ..................... | 327/333 |

(Continued)

FOREIGN PATENT DOCUMENTS

| JP | 59-187837 | 12/1984 |
|---|---|---|
| JP | 02-048720 | 2/1990 |
| JP | 2003-234947 | 8/2003 |

OTHER PUBLICATIONS

JP Office Action dated Jan. 28, 2014, with English translation; Application No. 2010-140594.

*Primary Examiner* — Mischita Henson
*Assistant Examiner* — Stephanie Bloss
(74) *Attorney, Agent, or Firm* — Young & Thompson

(57) ABSTRACT

There is a need to solve a possible system malfunction when a power supply voltage decreases steeply. To solve this problem, a control method is provided for a voltage detection system having an interrupt mode and a reset mode. First and second detection levels are configured. When a power supply voltage is higher than the first detection level, a latch circuit is placed in a first state to enable the interrupt mode. When the power supply voltage becomes lower than or equal to the first detection level, an interrupt signal is generated to change the latch circuit from the first state to a second state and enable the reset mode. A system reset is issued when the power supply voltage becomes lower than or equal to the second detection level in the reset mode.

7 Claims, 14 Drawing Sheets

(56) References Cited

U.S. PATENT DOCUMENTS

| | | | |
|---|---|---|---|
| 2006/0139985 A1* | 6/2006 | Kanda | G11C 16/20 365/94 |
| 2006/0214650 A1* | 9/2006 | Hirooka | H03K 17/223 323/311 |
| 2008/0012604 A1* | 1/2008 | Morishita et al. | 327/78 |
| 2008/0012613 A1* | 1/2008 | Hotaka | H03K 3/356008 327/143 |
| 2010/0088503 A1* | 4/2010 | Eto | G06F 1/30 713/100 |
| 2011/0121870 A1* | 5/2011 | Morino | 327/143 |

* cited by examiner

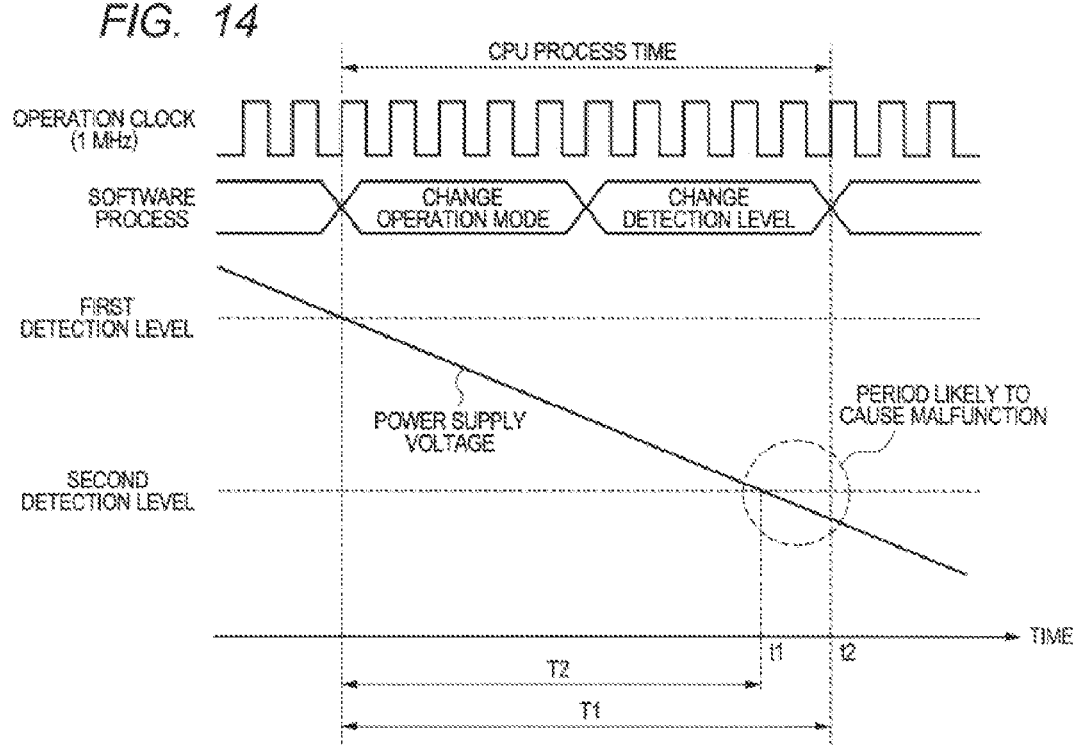
PRIOR ART

VOLTAGE DETECTION SYSTEM AND CONTROLLING METHOD OF THE SAME

CROSS-REFERENCE TO RELATED APPLICATIONS

The disclosure of Japanese Patent Application No. 2010-140594 filed on Jun. 21, 2010 including the specification, drawings and abstract is incorporated herein by reference in its entirety.

BACKGROUND

The present invention relates to a voltage detection system and a controlling method of the same.

FIG. 10 shows a block diagram of a voltage detection circuit described in Group hardware manual pp. 799-821 for RENESAS 16-bit single-chip microcomputer H8S family/H8STiny series H8S/20103, H8S/20203, H8S/20223, H8S/20115, H8S/20215, and H8S/20235 as a related art. The voltage detection circuit detects a decrease in power supply voltage to prevent malfunction (erratic operation) of an LSI system mounted with the voltage detection circuit. The voltage detection circuit can save data to be restored to a state before the voltage drop after the power supply is recovered to the normal voltage.

As shown in FIG. 10, the voltage detection circuit includes a ladder resistor, a detection voltage generation circuit, a comparator, a reset control circuit, an interrupt control circuit, a register capable of being rewritten by a CPU instruction, and a control circuit that changes processes based on register values. For example, a comparator LVD1 compares a voltage divided by the ladder resistor with Vdet1 generated from the detection voltage generation circuit.

The control circuit is supplied with a detection signal from the comparator LVD1 to detect the state of the power supply voltage. The detection signal is used to determine whether the current power supply voltage conforms to an operating voltage. Accordingly, transition to the standby mode is possible at the operating voltage or higher during normal operation. The system stability can be improved by the elimination of an instable state where the power supply voltage becomes lower than the operating voltage.

FIG. 11 is a flowchart showing operations of the voltage detection circuit. As shown in FIG. 11, the system starts and then the CPU sets the register to configure an operation mode and a first detection level (step S1). A timer operates on software processing for the wait time long enough to stabilize the detection level (step S2). The CPU then sets the register to enable low-voltage detection (step S3). For example, this signifies that the control circuit becomes ready for accepting a detection signal from the comparator LVD1. Steps S1 through S3 or an equivalent operation is referred to as a CPU process.

The process is then passed to the hardware. For example, the comparator LVD1 monitors a decrease in the power supply voltage. The comparator LVD1 detects that the power supply voltage decreases and becomes equal to the first detection level (Yes at step S4). Control is passed to the CPU process at steps S5 through S7 equivalent to steps S1 through S3 as mentioned above in order to change the operation mode and the detection mode. Specifically, the CPU sets the register to configure an operation mode and a second detection level (step S5). The timer operates on software processing for the wait time long enough to stabilize the detection level (step S6). The CPU then sets the register to enable low-voltage detection (step S7).

Upon completion of the CPU process at step S7, control is passed to the hardware. For example, a comparator LVD2 monitors a decrease in the power supply voltage. The detection level is changed to the operating voltage (second detection level). The comparator LVD2 compares the second detection level with the power supply voltage (step S14). When the power supply voltage becomes lower than the second detection level, the comparator LVD2 resets the system (step S15).

At step S4, the comparator LVD1 may detect that the power supply voltage decreases and becomes equal to the first detection level. In this case, the system starts a data saving program (step S8). When the data saving process is complete (Yes at step S9), the main process awaits a request from a CPU instruction to change the operation mode and the detection level (step S10).

When the CPU issues a change request (Yes at step S10), control is passed to the CPU process at steps S11 through S13 equivalent to steps S1 through S3 as mentioned above. Specifically, the CPU sets the register to configure the operation mode and the first detection level (step S11). The timer operates on software processing for the wait time long enough to stabilize the detection level (step S12). The CPU then sets the register to enable low-voltage detection (step S13). The power supply is ready to be restored to the original condition (step S16).

SUMMARY

Fields of home electronics and consumer products indispensably require preventing the system configuring a device from operating abnormally during the power supply recovery from a voltage drop in order to fast acquire and monitor information about the system. FIG. 12 shows that a power supply voltage decreases gradually. The power supply voltage becomes lower than the first detection level and further becomes lower than the second detection level as mentioned above during period T2. The CPU process (steps S5 to S7 in FIG. 11) is performed during period T1. Since period T2 is longer than period T1, the voltage detection circuit can detect that the power supply voltage is lower than the detection level.

FIG. 13 shows that a power supply voltage decreases steeply. The power supply voltage becomes lower than the first detection level and further becomes lower than the second detection level during period T2. The CPU process (steps S5 to S7 in FIG. 11) is performed during period T1. In this case, period T2 is shorter than period T1. The CPU process during period T2 is based on software. When the power supply voltage decreases to the second detection level, the voltage detection circuit cannot detect a decrease in voltage.

FIG. 14 is a timing chart showing that the CPU operates at 1 MHz. Let us suppose that ten clocks are needed to change the operation mode and the detection level. Then, completion of the CPU process requires ten microseconds. The voltage detection circuit cannot detect a decrease in voltage even when the power supply voltage becomes lower than the second detection level, i.e., the operating voltage for the CPU, in shorter than ten microseconds. The CPU process is performed at a power supply voltage lower than the operating voltage for the CPU during a period between time points t1 and t2 in FIG. 14. The CPU is likely to malfunction.

According to one aspect of the present invention, there is provided a control method for a voltage detection system having an interrupt mode capable of saving LSI system information using an interrupt signal and a reset mode capable of resetting a system using a reset signal. The control method sets a first detection level and a second detection level for a voltage lower than the first detection level. When a power supply voltage is higher than the first detection level, the control method places a latch circuit in a first state and sets the voltage detection system to the interrupt mode. When the power supply voltage becomes lower than or equal to the first detection level, the control method generates the interrupt signal and changes the first latch circuit from the first state to a second state. In this manner, the control method sets the voltage detection system to the reset mode. The control method generates the reset signal when the power supply voltage becomes lower than or equal to the second detection level in the reset mode.

According to another aspect of the present invention, there is provided a voltage detection system having an interrupt mode capable of allowing a CPU to save system information using an interrupt signal and a reset mode capable of resetting a system using a reset signal. The voltage detection system includes a comparison voltage generation circuit, a comparator, a latch circuit, and a control circuit. The comparison voltage generation circuit generates a first detection level voltage and a second detection level voltage lower than the first detection level voltage. The comparator compares a power supply voltage with the first or second detection level voltage. The latch circuit operates on a comparison result from the comparator. The latch circuit is set to a first state when the power supply voltage is higher than the first detection level voltage. The latch circuit is set to a second state when the power supply voltage is lower than or equal to the first detection level voltage. The control circuit outputs the interrupt signal when the latch circuit is set to the first state and the power supply voltage becomes lower than or equal to the first detection level. The control circuit outputs the reset signal when the latch circuit is set to the second state and the power supply voltage becomes lower than or equal to the second detection level.

When the power supply voltage becomes lower than or equal to the first detection level, the control method for the voltage detection system according to the invention changes the latch circuit from the first state to the second state and consequently sets the voltage detection system to the reset mode. In this manner, changing the latch circuit state can fast enable the interrupt mode or the reset mode. The control method can complete the mode change process faster than a CPU-based software process that enables the interrupt mode or the reset mode.

The voltage detection system according to the invention can prevent the system from malfunctioning even when a power supply voltage decreases steeply.

BRIEF DESCRIPTION OF THE DRAWINGS

FIG. 14 is a timing chart showing a problem of the voltage detection circuit of the related art.

DETAILED DESCRIPTION

First Embodiment

Figure 1:
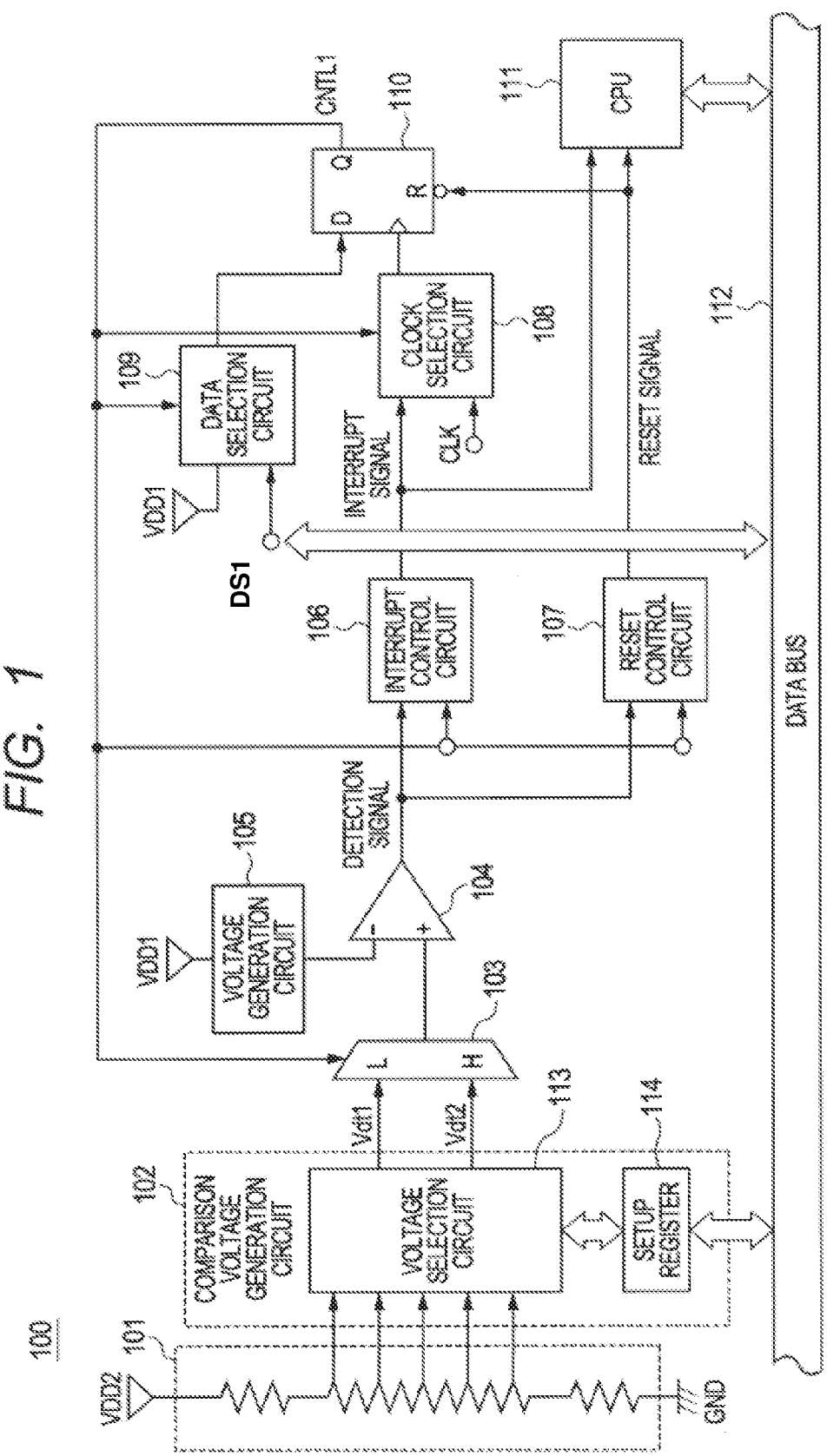
FIG. 1 is a block diagram showing a voltage detection system according to a first embodiment of the invention.

A first embodiment of the present invention will be described in detail with reference to the accompanying drawings. The first embodiment is an application of the invention to a voltage detection system. FIG. 1 shows a configuration of a voltage detection system 100 according to the first embodiment.

As shown in FIG. 1, the voltage detection system 100 includes a ladder resistor 101, a comparison voltage generation circuit 102, a comparison voltage selection circuit 103, a comparator 104, a voltage generation circuit 105, an interrupt control circuit 106, a reset control circuit 107, a clock selection circuit 108, a data selection circuit 109, a latch circuit 110, a CPU 111, and a data bus 112.

The ladder resistor 101 is coupled between an external power supply terminal VDD2 and a ground terminal GND. A voltage supplied from the external power supply terminal VDD2 is supplied from a power supply different from the power supply voltage VDD1 the voltage detection system 100 uses. The voltage supplied from the power supply terminal VDD2 is free from a voltage variation in the power supply voltage VDD1.

The voltage generation circuit 105 generates a voltage in accordance with the power supply voltage VDD1. Decreasing the power supply voltage VDD1 also decreases a voltage output from the voltage generation circuit 105. Increasing the power supply voltage VDD1 also increases a voltage output from the voltage generation circuit 105. The voltage generation circuit 105 may directly output the power supply voltage VDD1. The following description assumes that a voltage output from the voltage generation circuit 105 equals the power supply voltage VDD1.

The comparison voltage generation circuit 102 includes a voltage selection circuit 113 and a setup register 114. The setup register 114 stores data from the CPU 111. A value of the data is supplied from the CPU 111 through the data bus 112. The voltage selection circuit 113 supplies multiple voltages divided by the ladder resistor 101 using resistors. Based on values stored in the setup register 114, the voltage selection circuit 113 selects two of the voltages divided by the ladder resistor 101 using resistors. The voltage selection circuit 113 then outputs the two selected voltages as reference voltages Vdt1 and Vdt2. The relation between the reference voltages Vdt1 and Vdt2 is assumed to be Vdt1>Vdt2.

A value of the reference voltage Vdt1 is used to start saving the system data and is selected from values of the setup register 114.

A value of the reference voltage Vdt2 is selected so as to be equivalent to a minimum voltage for ensuring operations of the CPU 111. When a minimum voltage of 0.8 V ensures operations of the CPU 111, for example, the reference voltage Vdt2 is also set to 0.8 V. A value of the reference voltage Vdt2 is also selected from values of the setup register 114. The above-mentioned example assumes that the voltage generation circuit 105 outputs the power supply voltage VDD1. If the voltage generation circuit outputs a voltage other than the power supply voltage VDD1, the reference voltage Vdt2 is configured so that the output voltage corresponds to a minimum voltage for ensuing operations of the CPU 111.

The comparison voltage selection circuit 103 is supplied with the reference voltages Vdt1 and Vdt2, selects one of the supplied reference voltages Vdt1 and Vdt2 in accordance with the control signal CNTL1, and outputs the selected reference voltage. The comparison voltage selection circuit 103 selects the reference voltage Vdt1 when the control signal CNTL1 remains at a low level. The comparison voltage selection circuit 103 selects the reference voltage Vdt2 when the control signal CNTL1 remains at a high level.

A first detection level is enabled when the comparison voltage selection circuit 103 selects the reference voltage Vdt1. A second detection level is enabled when the comparison voltage selection circuit 103 selects the reference voltage Vdt2.

The comparator 104 compares the voltage (power supply voltage VDD1) from the voltage generation circuit 105 with the reference voltage selected by the comparison voltage selection circuit 103. The comparator 104 outputs the comparison result as a detection signal. The comparator 104 inputs the voltage (power supply voltage VDD1) from the voltage generation circuit 105 to an inverting input terminal. The comparator 104 inputs the reference voltage selected by the comparison voltage selection circuit 103 to a non-inverting input terminal.

The comparator 104 outputs a low-level detection signal when the voltage (power supply voltage VDD1) from the voltage generation circuit 105 is higher than the reference voltage selected by the comparison voltage selection circuit 103. By contrast, the comparator 104 outputs a high-level detection signal when the voltage (power supply voltage VDD1) from the voltage generation circuit 105 is lower than the reference voltage selected by the comparison voltage selection circuit 103.

The interrupt control circuit 106 outputs the detection signal from the comparator 104 as an interrupt signal in accordance with the control signal CNTL1. Specifically, the interrupt control circuit 106 outputs an interrupt signal in accordance with the detection signal when the control signal CNTL1 remains at the low level. In more detail, the interrupt control circuit 106 outputs a high-level pulse signal as an interrupt signal when the detection signal rises from the low level to the high level. The interrupt control circuit 106 does not operate when the control signal CNTL1 remains at the high level. In other words, the voltage detection system 100 operates in interrupt mode when the control signal CNTL1 remains at the low level.

The reset control circuit 107 outputs the detection signal from the comparator 104 as a reset signal in accordance with the control signal CNTL1. Specifically, the reset control circuit 107 outputs a reset signal in accordance with the detection signal when the control signal CNTL1 remains at the high level. In more detail, the reset control circuit 107 outputs a high-level pulse signal as a reset signal when the detection signal rises from the low level to the high level. The reset control circuit 107 does not operate when the control signal CNTL1 remains at the low level. In other words, the voltage detection system 100 operates in reset mode when the control signal CNTL1 remains at the high level.

The clock selection circuit 108 selectively outputs an interrupt signal from the interrupt control circuit 106 or a clock signal CLK in accordance with the control signal CNTL1. Specifically, the clock selection circuit 108 selects and outputs the interrupt signal from the interrupt control circuit 106 when the control signal CNTL1 remains at the low level. The clock selection circuit 108 selects and outputs the clock signal CLK when the control signal CNTL1 remains at the high level.

The data selection circuit 109 selectively outputs the power supply voltage VDD1, i.e., a high-level data signal, or a data signal DS1 supplied from the CPU 111 via the data bus 112. Specifically, the data selection circuit 109 selects and outputs the high-level data signal when the control signal CNTL1 remains at the low level. The data selection circuit 109 selects and outputs the data signal DS1 when the control signal CNTL1 remains at the high level.

The latch circuit 110 is equivalent to a flip-flop circuit. The latch circuit 110 synchronizes with a rising edge of a signal supplied to a clock input terminal, latches a value for a data signal supplied to a data input terminal D, and outputs the control signal CNTL1. The data input terminal D is supplied with an output signal from the data selection circuit 109. The clock input terminal is supplied with an output signal from the clock selection circuit 108. The latch circuit 110 is reset in accordance with a reset signal supplied from a reset signal input terminal R. When the latch circuit 110 is reset, the control signal CNTL1 goes to the low level.

The latch circuit 110 may latch and output a high-level data signal output from the data selection circuit 109. This state is defined as "setting the latch circuit 110". The latch circuit 110 may latch and output a low-level data signal DS1 output from the data selection circuit 109. This state is defined as "clearing the latch circuit 110".

The CPU 111 operates on the power supply voltage VDD1. For example, the operating voltage is defined as a voltage higher than or equal to the reference voltage Vdt2. The CPU 111 may malfunction when the operating voltage becomes lower than or equal to the reference voltage Vdt2.

When receiving an interrupt signal from the interrupt control circuit 106, the CPU 111 calls a save program to save system information. The CPU 111 performs a save process based on the save program to save the system information. When the save process is complete, the data signal DS1 is issued via the data bus 112 to clear the latch circuit 110. Alternatively, a user instruction may be issued to clear the latch circuit 110 after the save process is complete.

When receiving a reset signal from the reset control circuit 107, the CPU 111 resets the system. The CPU 111 may be provided as a controller dedicated to the voltage detection system 100 or as an LSI CPU using the voltage detection system 100.

The interrupt control circuit 106, the reset control circuit 107, the clock selection circuit 108, and the data selection circuit 109 may be assumed to configure one control circuit.

Figure 2:
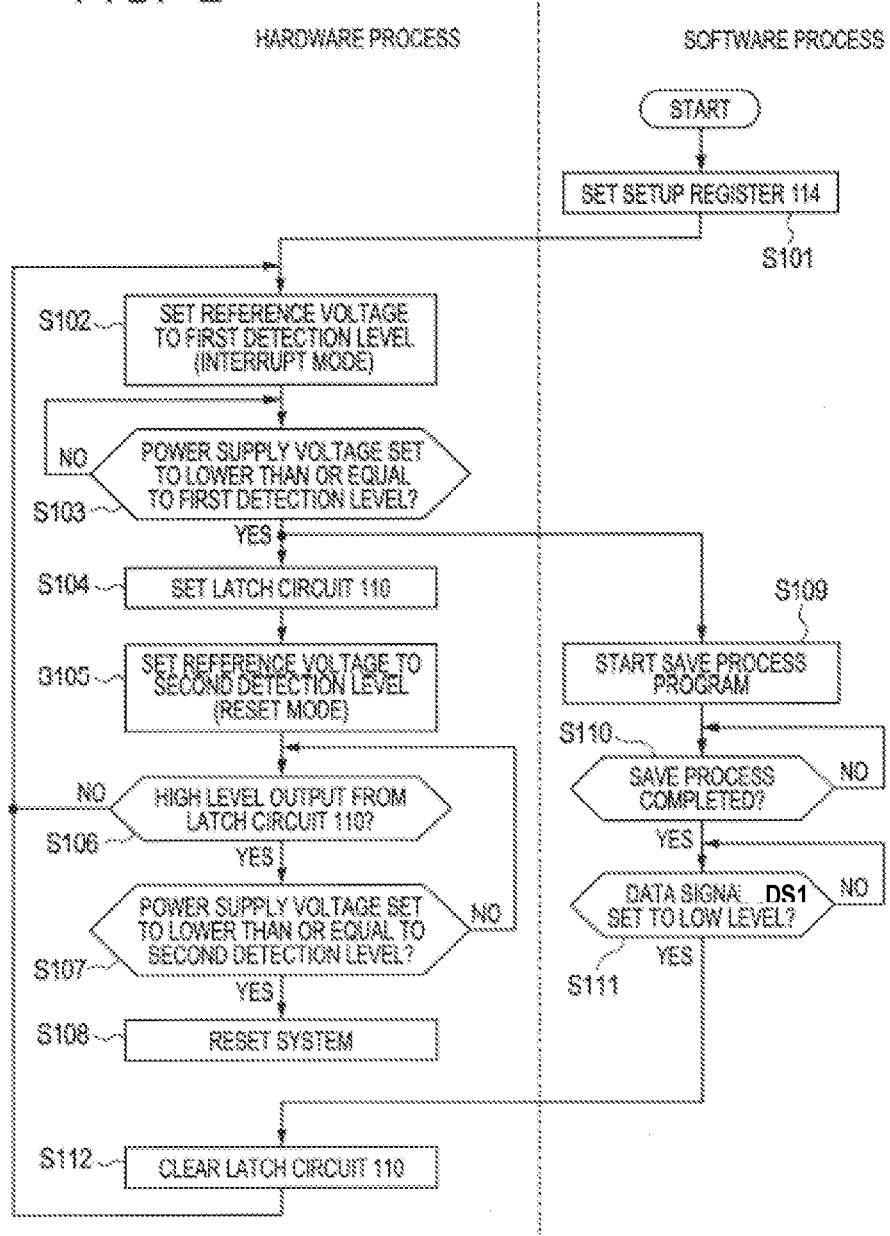
FIG. 2 is a flowchart showing operations of the voltage detection system according to the first embodiment of the invention.

Operations of the voltage detection system 100 will be described below. FIG. 2 is a flowchart showing operations of the voltage detection system 100. In FIG. 2, a software process signifies a case where the CPU 111 operates on a program for processing. A hardware process signifies a case where only the hardware operates on a control signal, an interrupt signal, or a reset signal without any program-based operation.

When the system starts, the CPU 111 supplies a value to the setup register 114 of the comparison voltage generation circuit 102 (step S101). Based on the value of the setup register 114, the voltage selection circuit 113 selects two of voltages supplied from the ladder resistor 101 and outputs them as the reference voltages Vdt1 and Vdt2.

Initially, the control signal CNTL1 is set to the low level. The comparison voltage selection circuit 103 selects the reference voltage Vdt1 and enables the first detection level (step S102). The voltage detection system 100 operates in the interrupt mode since the control signal CNTL1 is set to the low level.

The comparator 104 checks whether the power supply voltage VDD1 output from the voltage generation circuit 105 is lower than or equal to the first detection level (reference voltage Vdt1). When the power supply voltage VDD1 is lower than or equal to the first detection level (Yes at step S103), the detection signal output from the comparator 104 rises from the low level to the high level.

When the detection signal rises from the low level to the high level, the interrupt signal from the interrupt control circuit 106 goes to the high level. The interrupt signal passes through the clock selection circuit 108 and is input to the data input terminal of the latch circuit 110. The latch circuit 110 sets high-level data (step S104).

The control signal CNTL1 from the latch circuit 110 goes to the high level. Therefore, the comparison voltage selection circuit 103 selects the reference voltage Vdt2 and enables the second detection level (step S105). The voltage detection system 100 operates in the reset mode since the control signal CNTL1 is set to the high level. Consequently, the reset control circuit 107 operates and awaits a detection signal from the comparator 104. The clock selection circuit 108 selects and outputs the clock signal CLK. The data selection circuit 109 selects and outputs the data signal DS1. At this time, the data signal DS1 is set to the high level.

When the latch circuit 110 outputs the high-level control signal CNTL1 (Yes at step S106), the comparator 104 checks whether the power supply voltage VDD1 output from the voltage generation circuit 105 is lower than or equal to the second detection level (reference voltage Vdt2) (step S107). When the power supply voltage VDD1 is lower than or equal to the second detection level (Yes at step S107), the detection signal output from the comparator 104 rises from the low level to the high level. The reset control circuit 107 outputs a reset signal. The CPU 111 is reset. The system is also reset (step S108).

When the power supply voltage VDD1 is lower than or equal to the first detection level (reference voltage Vdt1) at step S103, the interrupt control circuit 106 outputs an interrupt signal in accordance with the detection signal that rises from the low level to the high level. The CPU 111 accordingly calls the save program for saving the system information and starts the save program (step S109).

When the save process is complete (Yes at step S110), the CPU 111 transmits the low-level data signal DS1 via the data bus 112 (Yes at step S111). The latch circuit 110 latches the low-level data signal S1. The latch circuit 110 is then cleared (step S112).

When the latch circuit 110 is cleared (step S112), the control signal CNTL1 goes to the low level. The comparison voltage selection circuit 103 selects the reference voltage Vdt1 to enable the first detection level. Control returns to step S102.

Figure 3:
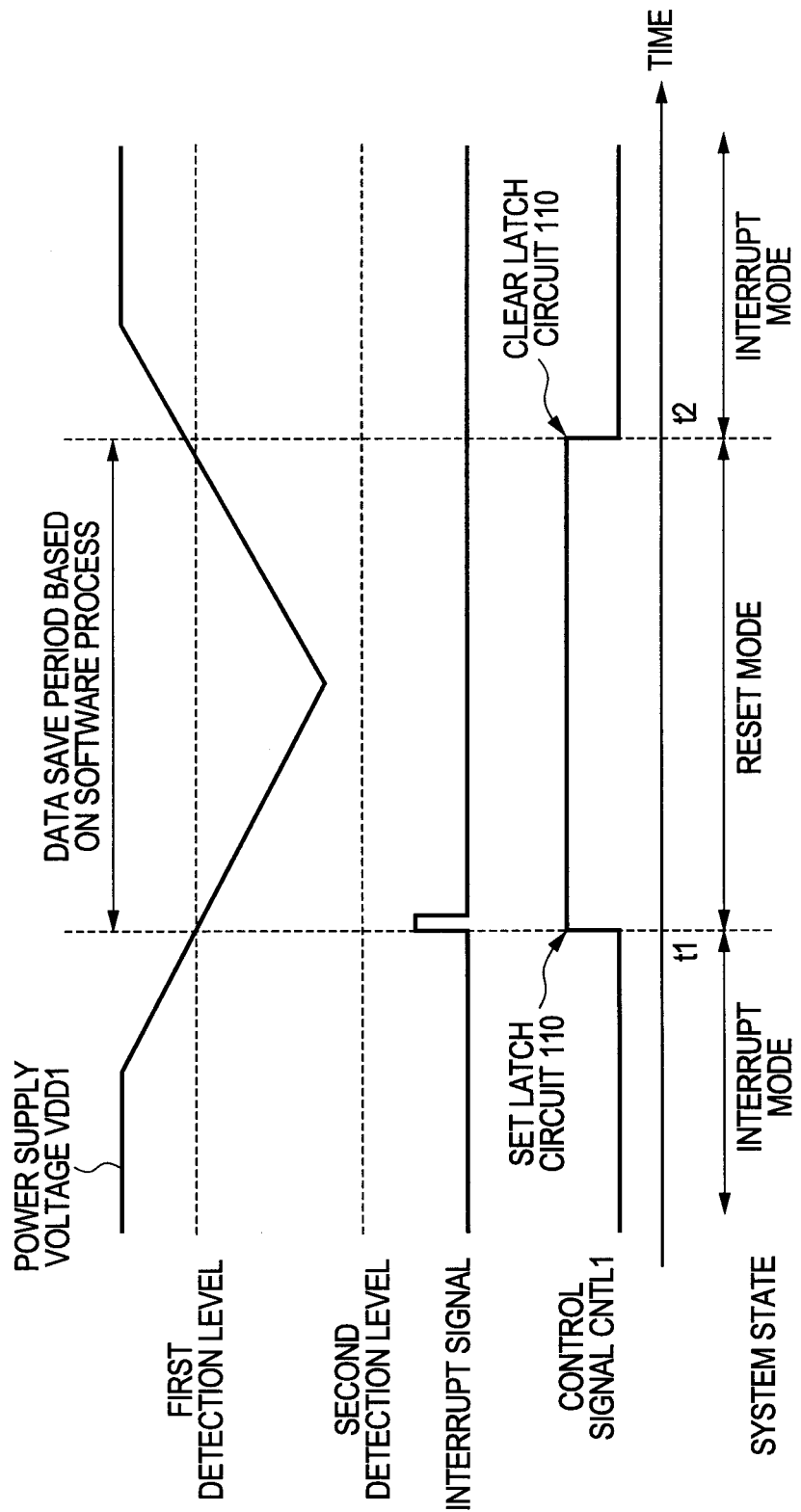
FIG. 3 is a timing chart showing operations of the voltage detection system according to the first embodiment of the invention.
Figure 4:
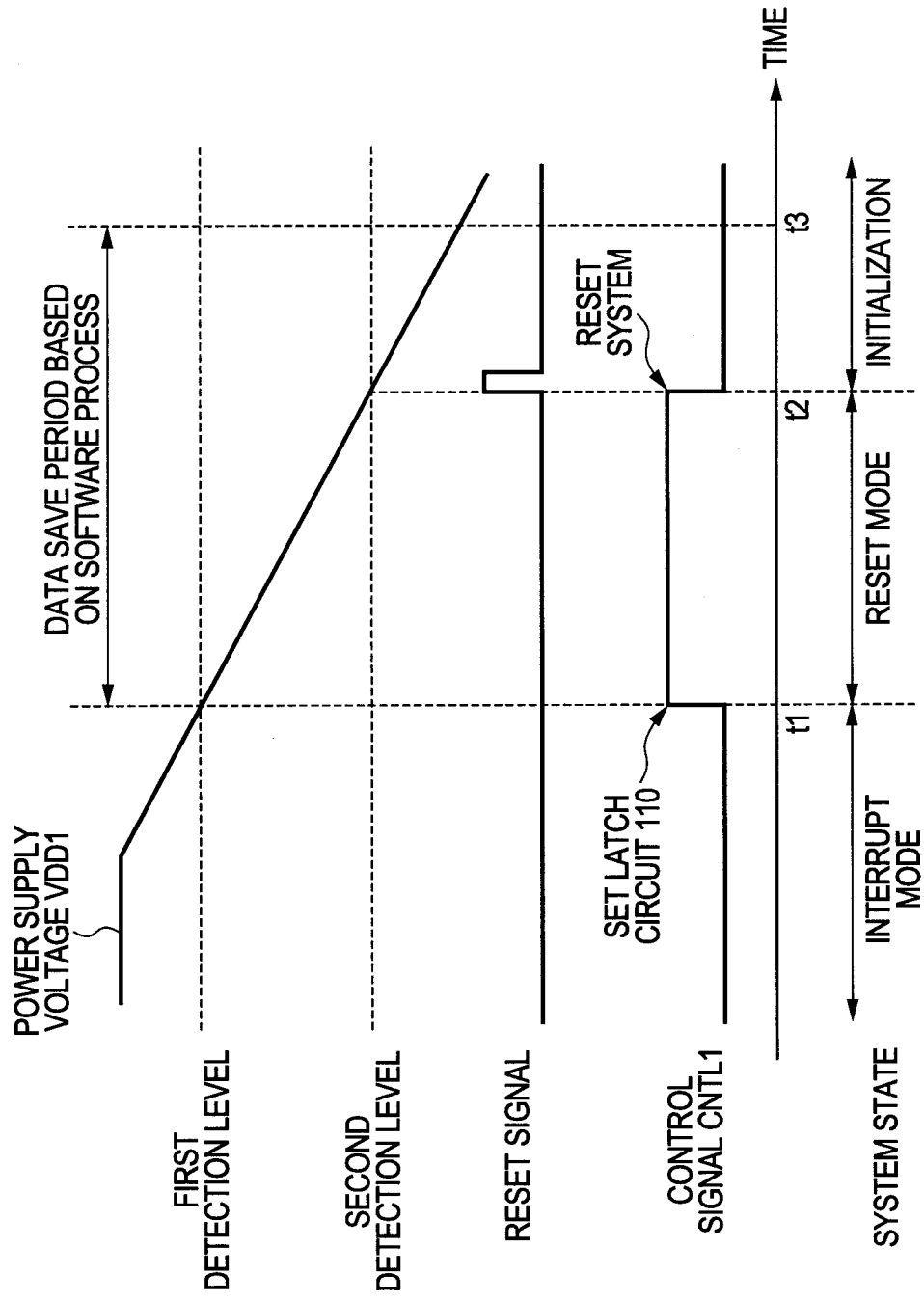
FIG. 4 is a timing chart showing operations of the voltage detection system according to the first embodiment of the invention.

FIGS. 3 and 4 are timing charts showing operations of the voltage detection system 100 that operates in accordance with the above-mentioned flowchart.

FIG. 3 shows that the power supply voltage VDD1 becomes lower than the first detection level and then is restored to the first detection level or higher. At time t1 or earlier, the control signal CNTL1 is set to the low level and the comparison voltage selection circuit 103 selects the first detection level (reference voltage Vdt1). The comparator 104 monitors whether the power supply voltage VDD1 is lower than the first detection level.

Since the control signal CNTL1 is set to the low level, the interrupt control circuit 106 operates. The system enters the interrupt mode during this period.

At time t1, the power supply voltage VDD1 decreases below the first detection level. The comparator 104 raises the detection signal from the low level to the high level. The interrupt control circuit 106 outputs an interrupt signal. The latch circuit 110 is set in synchronization with the rise of the interrupt signal to the high level.

The latch circuit 110 is set. The control signal CNTL1 is set to the high level. Consequently, the system enters the reset mode. The comparator 104 monitors whether the power supply voltage VDD1 is lower than the second detection level.

Since the interrupt signal goes to the high level, the CPU 111 starts saving system data based on the software process. When the data save process is complete, the CPU 111 transmits the low-level data signal DS1. At time t2, the latch circuit 110 latches the low-level data signal DS1. As a result, the latch circuit 110 is cleared. The control signal CNTL1 again goes to the low level. When the power supply voltage VDD1 is higher than the first detection level at this time, the voltage returns to the same state as that at time t1 or earlier.

FIG. 4 shows that the power supply voltage VDD1 becomes lower than the first detection level and then becomes lower than the second detection level. The state at time t2 or earlier is the same as that described with reference to FIG. 3 and a description is omitted for simplicity.

As shown in FIG. 4, the power supply voltage VDD1 becomes lower than the second detection level before time t3 at which the software process completes the system data save process. When the power supply voltage VDD1 becomes lower than the second detection level in the reset mode, the reset control circuit 107 outputs a reset signal to the CPU 111 and the latch circuit 110. The reset signal resets the CPU 111 and the system (initialized). The latch circuit 110 is also supplied with the reset signal at a reset terminal and is reset.

Figure 11:
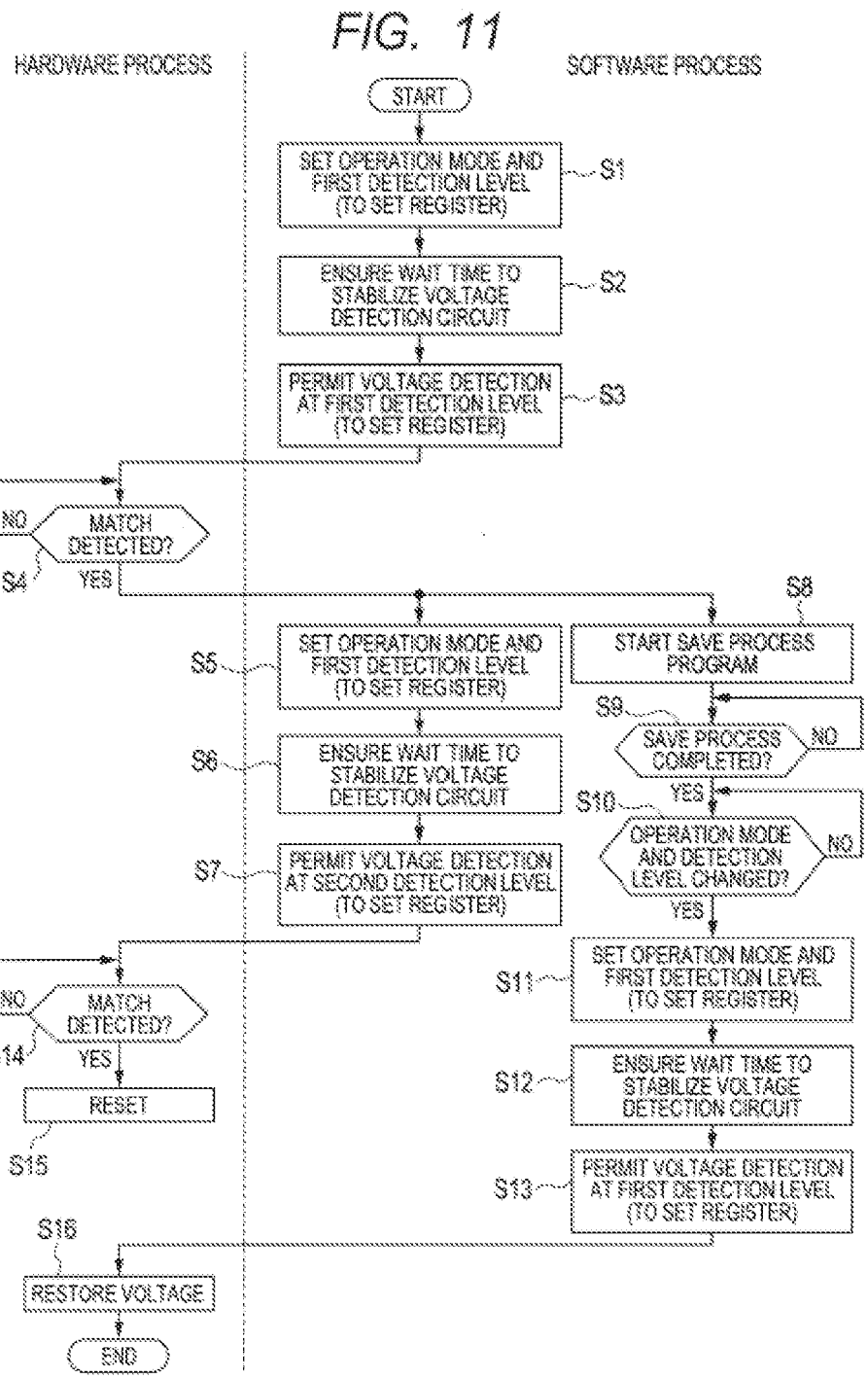
FIG. 11 is a timing chart showing operations of a system using the voltage detection circuit of the related art.
Figure 12:
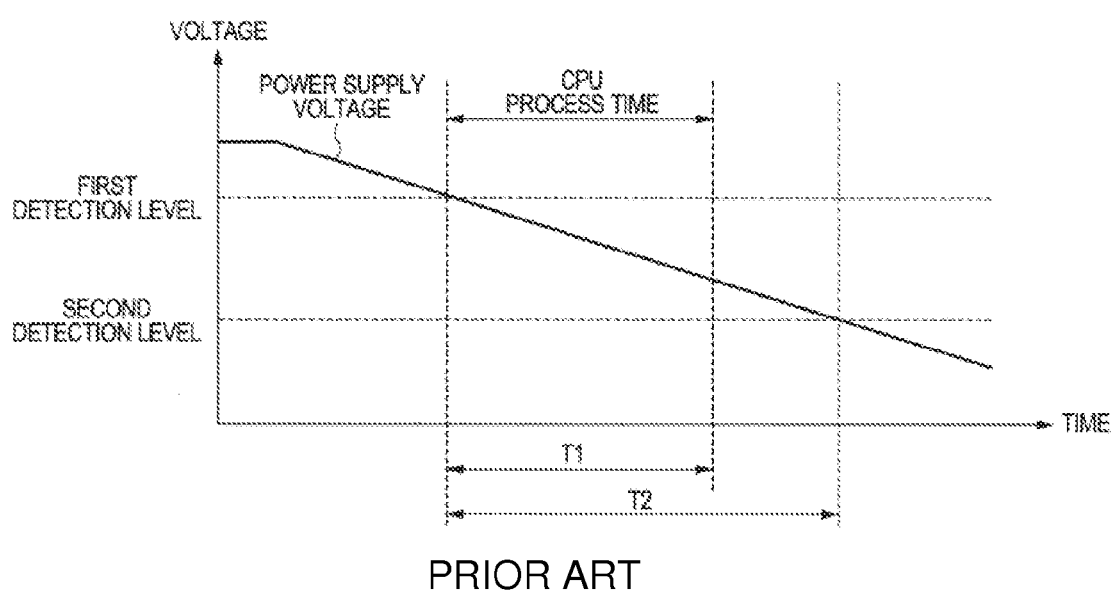
FIG. 12 is a timing chart showing operations of the voltage detection circuit of the related art.
Figure 13:
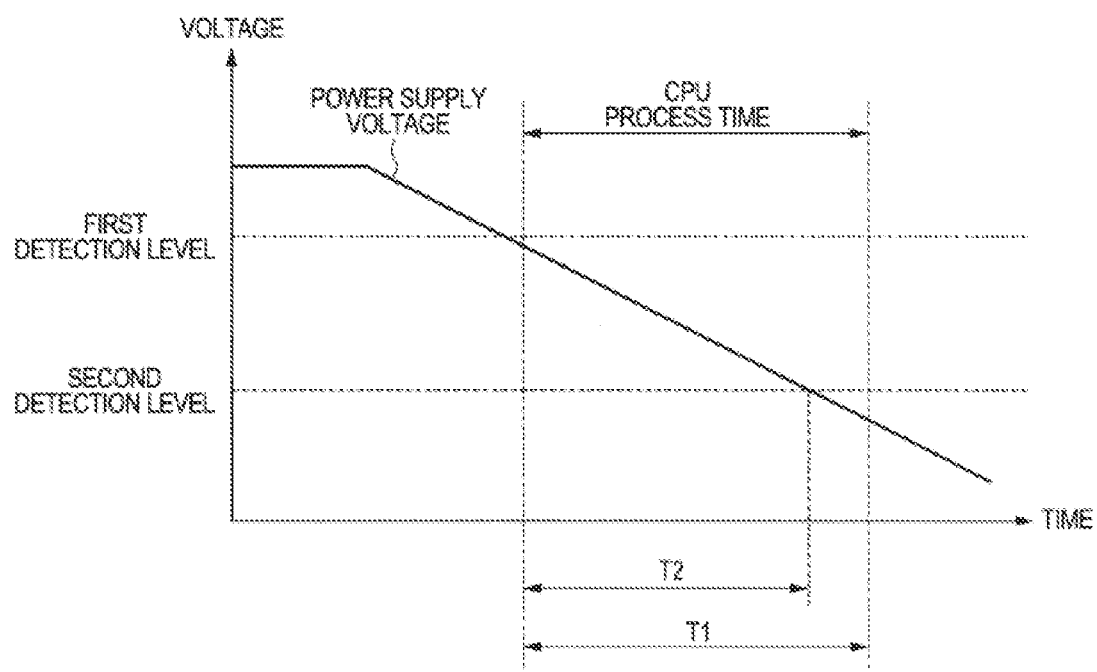
FIG. 13 is a timing chart showing a problem of the voltage detection circuit of the related art.

The voltage detection circuit of the related art and the voltage detection system including the same use a software process to change the operation mode and the detection level and cannot detect a decrease in the power supply voltage to become lower than the second detection level during the CPU process (e.g., steps S5 to S7 in FIG. 11). If a system data saving process is performed under this condition, the CPU executes the save program at a voltage below the operating voltage. Reliability of the saved data degrades. The system may not be able to recover reliably using data saved after the voltage is restored to the original condition. The system may malfunction because the CPU operates at a voltage below the operating voltage.

On the other hand, the voltage detection system 100 according to the first embodiment uses the output signal (control signal CNTL1) from the latch circuit 110 to change the operation mode and the detection level based on a hardware process. The hardware process can change the operation mode and the detection level much faster than the software process as used for the voltage detection circuit of the related art. Even if the power supply voltage decreases steeply, the voltage detection system 100 can detect a decrease in the voltage to be lower than the CPU operating voltage (second detection level). In this case, a system reset can be issued to improve the system reliability.

The voltage detection circuit of the related art requires multiple comparators for detecting the first and second detection levels. On the other hand, the voltage detection system 100 according to the first embodiment can switch between the first and second detection levels in accordance with the control signal CNTL1. One comparator can be used to compare these detection levels with the power supply voltage. The voltage detection system 100 can decrease the number of comparators compared to the voltage detection circuit of the related art and reduce the circuit area.

Second Embodiment

Figure 5:
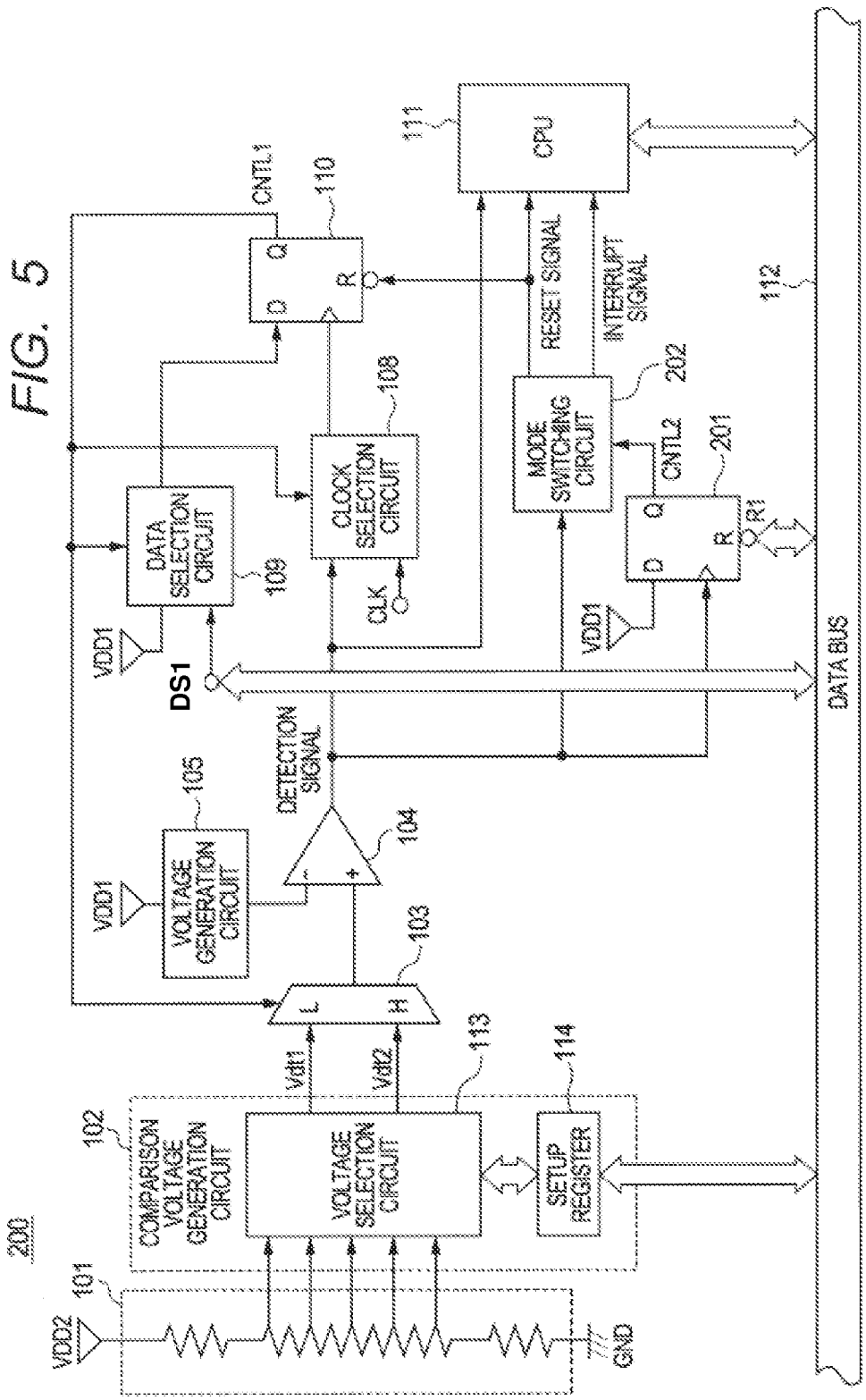
FIG. 5 is a block diagram showing a voltage detection system according to a second embodiment of the invention.

A second embodiment of the present invention will be described in detail with reference to the accompanying drawings. Similarly to the first embodiment, the second embodiment is also an application of the invention to a voltage detection system. FIG. 5 shows a configuration of a voltage detection system 200 according to the second embodiment.

As shown in FIG. 5, the voltage detection system 200 includes the ladder resistor 101, the comparison voltage generation circuit 102, the comparison voltage selection circuit 103, the comparator 104, the voltage generation circuit 105, the clock selection circuit 108, the data selection circuit 109, the latch circuits 110 and 201, CPU 111, the data bus 112, and a mode switching circuit 202.

FIG. 5 contains the same reference numerals as those in FIG. 1. These reference numerals signify components equal or similar to those shown in FIG. 1. The second embodiment differs from the first embodiment in that the latch circuit 201 and the mode switching circuit 202 are provided and the interrupt control circuit 106 and the reset control circuit 107 are omitted. According to the second embodiment, the latch circuit 201 and the mode switching circuit 202, not the latch circuit 110, switch the reset mode to the interrupt mode.

The other configurations are similar to those in the first embodiment and a detailed description is omitted for simplicity unless otherwise specified. The second embodiment mainly describes differences from the first embodiment.

The clock selection circuit 108 selectively outputs a detection signal from the comparator 104 or the clock signal CLK in accordance with the control signal CNTL1. Specifically, the clock selection circuit 108 selects the detection signal from the comparator when the control signal CNTL1 is set to the low level. The clock selection circuit 108 selects the clock signal CLK when the control signal CNTL1 is set to the high level.

The latch circuit 201 is a flip-flop circuit. The latch circuit 201 synchronizes with a rise of the detection signal supplied to the clock input terminal, latches a value of the high-level data signal input to the data input terminal D, and outputs a control signal CNTL2. The latch circuit 201 is reset in accordance with a reset signal R1 (CPU instruction) supplied from the reset signal input terminal R of the latch circuit 201. The reset signal R1 is transmitted from the CPU 111 via the data bus 112. When the latch circuit 201 is reset, the control signal CNTL2 goes to the low level.

The latch circuit 201 may latch and output a high-level data signal output from the data selection circuit 109. This state is defined as "setting the latch circuit 201". A signal transmitted from the CPU 111 may reset the latch circuit 201. This state is defined as "resetting the latch circuit 201".

In the second embodiment, the voltage detection system 200 is assumed to enter the interrupt mode when the control signal CNTL2 output from the latch circuit 201 is set to the low level. The voltage detection system 200 is assumed to enter the reset mode when the control signal CNTL2 is set to the high level.

The mode switching circuit 202 outputs a detection signal as the reset signal or the interrupt signal in accordance with the control signal CNTL2. Specifically, the mode switching circuit 202 outputs the interrupt signal in accordance with the detection signal when the control signal CNTL2 is set to the low level. The mode switching circuit 202 outputs the reset signal in accordance with the detection signal when the control signal CNTL2 is set to the high level. Namely, the voltage detection system 200 operates in the interrupt mode when the control signal CNTL2 is set to the low level. The voltage detection system 200 operates in the reset mode when the control signal CNTL2 is set to the high level.

The clock selection circuit 108, the data selection circuit 109, and the mode switching circuit 202 may be assumed to configure one control circuit.

Figure 6:
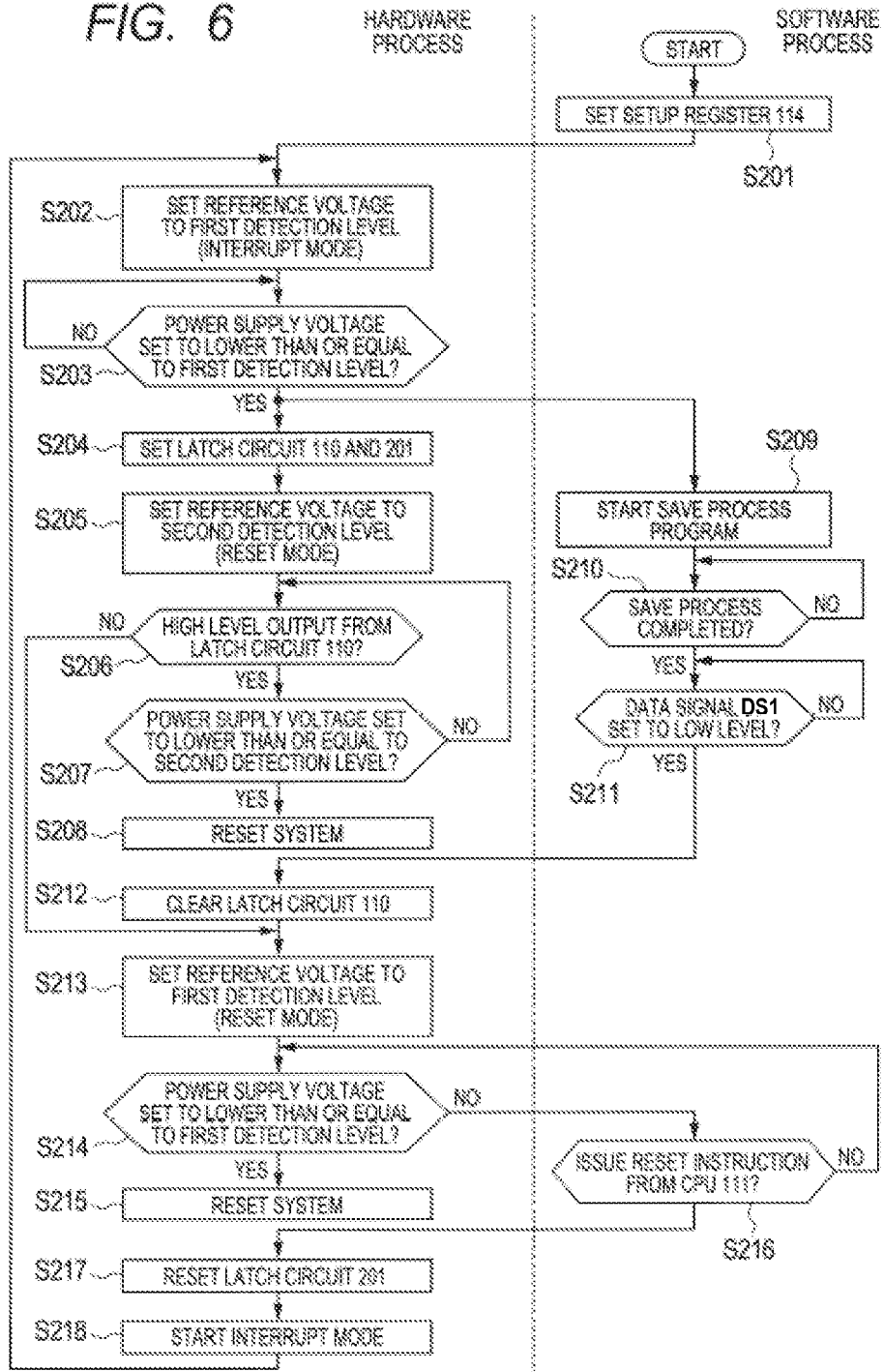
FIG. 6 is a flowchart showing operations of the voltage detection system according to the second embodiment of the invention.

Operations of the voltage detection system 200 will be described below. FIG. 6 is a flowchart showing operations of the voltage detection system 200.

When the system starts, the CPU 111 supplies a value to the setup register 114 of the comparison voltage generation circuit 102 (step S201). Based on the value of the setup register 114, the voltage selection circuit 113 selects two of voltages supplied from the ladder resistor 101 and outputs them as the reference voltages Vdt1 and Vdt2.

Initially, the control signal CNTL1 is set to the low level. The comparison voltage selection circuit 103 selects the reference voltage Vdt1 and enables the first detection level (step S202). The voltage detection system 200 operates in the interrupt mode since the control signal CNTL2 is also set to the low level.

The comparator 104 checks whether the power supply voltage VDD1 output from the voltage generation circuit 105 is lower than or equal to the first detection level (reference voltage Vdt1). When the power supply voltage VDD1 is lower than or equal to the first detection level (Yes at step S203), the detection signal output from the comparator 104 rises from the low level to the high level.

Since the control signal CNTL1 is set to the low level, the clock selection circuit 108 outputs a detection signal to the clock input terminal of the latch circuit 110. The clock input terminals of the latch circuits 110 and 201 are supplied with the detection signal rising from the low level to the high level. The latch circuits 110 and 201 are set (step S204).

The control signal CNTL1 from the latch circuit 110 goes to the high level. Therefore, the comparison voltage selection circuit 103 selects the reference voltage Vdt2 and enables the second detection level (step S205). The voltage detection system 200 operates in the reset mode since the control signal CNTL2 is set to the high level. Since the control signal CNTL1 is set to the high level, the clock selection circuit 108 selects and outputs the clock signal CLK. The data selection circuit 109 selects and outputs the data signal DS1. At this time, the data signal DS1 is set to the high level.

When the latch circuit 110 outputs the high-level control signal CNTL1 (Yes at step S206), the comparator 104 checks whether the power supply voltage VDD1 output from the voltage generation circuit 105 is lower than or equal to the second detection level (reference voltage Vdt2) (step S207). When the power supply voltage VDD1 is lower than or equal to the second detection level (Yes at step S207), the detection signal output from the comparator 104 rises from the low level to the high level. The mode switching circuit 202 outputs a reset signal. The CPU 111 is reset. The system is also reset (step S208).

When the power supply voltage VDD1 does not become lower than or equal to the second detection level (reference voltage Vdt2) (No at step S207), control returns to step S206. When the control signal CNTL1 is set to the low level at step S206 (No at step S206), control proceeds to step S213 to be described later. The comparison voltage selection circuit 103 selects the reference voltage Vdt1 to enable the first detection level.

When the power supply voltage VDD1 is lower than or equal to the first detection level (reference voltage Vdt1) at step S203, the mode switching circuit 202 outputs an interrupt signal, i.e., the detection signal that rises from the low level to the high level. The CPU 111 accordingly calls the save program for saving the system information and starts the save program (step S209).

When the save process is complete (Yes at step S210), the CPU 111 transmits the low-level data signal DS1 via the data bus 112 (Yes at step S211). The latch circuit 110 latches the low-level data signal DS1. The latch circuit 110 is then cleared (step S212).

When the latch circuit 110 is cleared (step S212), the control signal CNTL1 goes to the low level. The comparison voltage selection circuit 103 selects the reference voltage Vdt1 to enable the first detection level (step S213).

When the control signal CNTL1 is set to the low level at step S206 (No at step S206) as mentioned above, the comparison voltage selection circuit 103 selects the reference voltage Vdt1 to enable the first detection level. The reset mode continues.

The comparator 104 checks whether the power supply voltage VDD1 output from the voltage generation circuit 105 is higher than or equal to the first detection level (reference voltage Vdt1) (step S214). The power supply voltage VDD1 becomes higher than or equal to the first detection level (reference voltage Vdt1) (No at step S214). The CPU 111 may issue a reset instruction to the latch circuit 201 (Yes at step S216). In this case, the latch circuit 201 is reset (step S217). The latch circuit 201 is reset. The control signal CNTL2 goes to the low level. The system enters the interrupt mode (step S218). Control returns to step S202.

At step S214, the power supply voltage VDD1 may be assumed to be lower than or equal to the first detection level (reference voltage Vdt1). In this case, the CPU 111 issues a system reset (step S215) assuming that power supply voltage VDD1 slowly increases and is therefore unstable.

Figure 7:
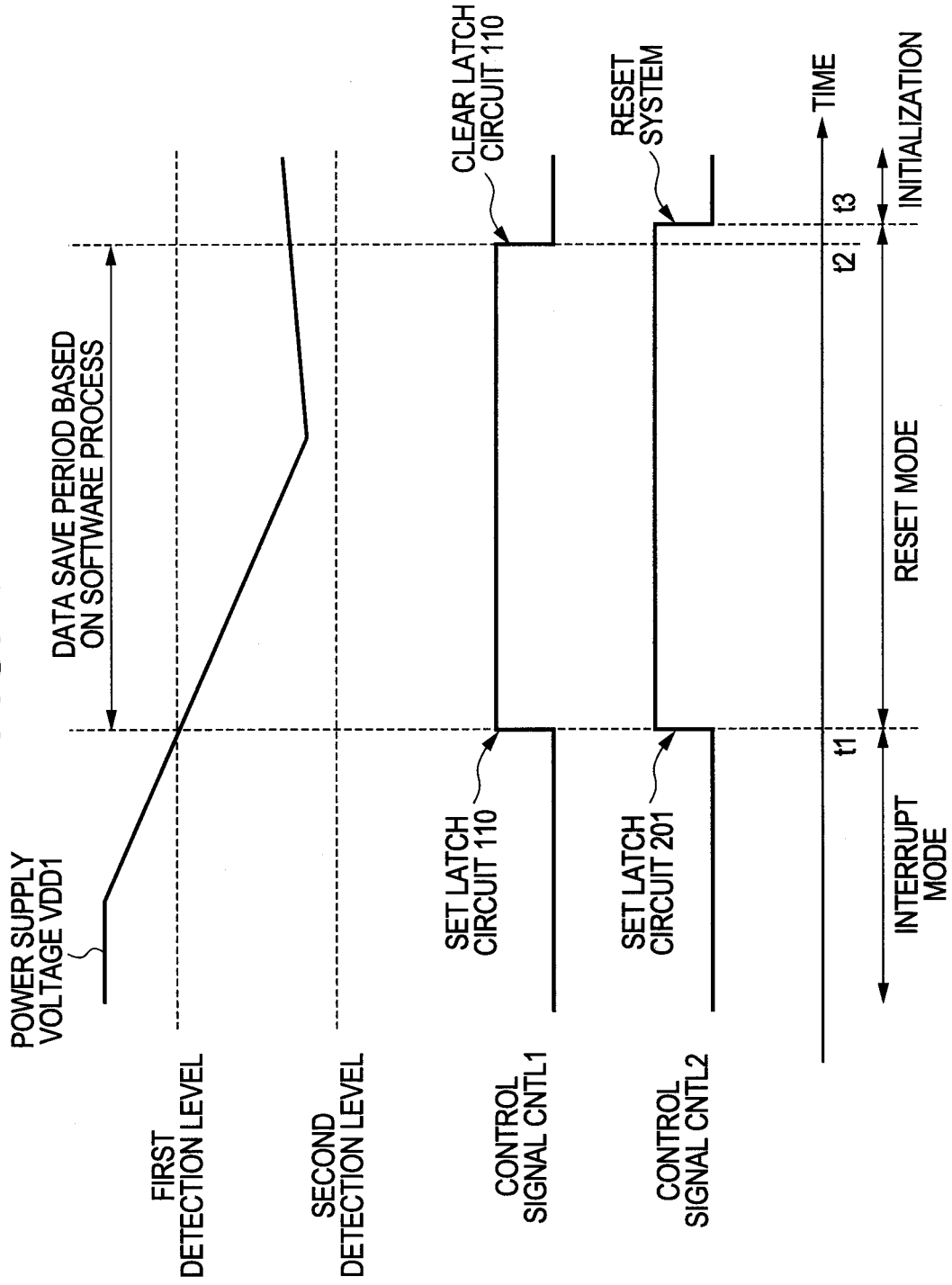
FIG. 7 is a timing chart showing operations of the voltage detection system according to the second embodiment of the invention.

FIG. 7 is a timing chart showing operations of the voltage detection system 200 that operates in accordance with the above-mentioned flowchart.

FIG. 7 shows that the power supply voltage VDD1 becomes lower than the first detection level and is not restored to the first detection level or higher. At time t1 or earlier, the control signal CNTL1 is set to the low level and the comparison voltage selection circuit 103 selects the first detection level (reference voltage Vdt1). The comparator 104 monitors whether the power supply voltage VDD1 is lower than the first detection level.

The control signal CNTL2 is set to the low level.

Accordingly, the mode switching circuit 202 outputs an interrupt signal to the CPU 111 when the detection signal rises to the high level. The voltage detection system 200 enters the interrupt mode during this period.

At time t1, the power supply voltage VDD1 decreases below the first detection level. The comparator 104 raises the detection signal from the low level to the high level. The latch circuits 110 and 201 are set in synchronization with the rise of the interrupt signal. The mode switching circuit 202 outputs an interrupt signal.

The latch circuit 110 is set. The control signal CNTL1 is set to the high level. Consequently, the comparison voltage selection circuit 103 selects the second detection level. The comparator 104 monitors whether the power supply voltage VDD1 is lower than the second detection level. At this time, the detection signal falls to the low level.

The latch circuit 201 is set. The control signal CNTL2 is set to the high level. Consequently, the mode switching circuit 202 outputs a reset signal to the CPU 111 after the detection signal rises to the high level. At time t1 or later, the voltage detection system 200 enters the reset mode.

Since the interrupt signal is issued, the CPU 111 starts saving system data based on the software process. When the data save process is complete, the CPU 111 transmits the low-level data signal S1. At time t2, the latch circuit 110 latches the low-level data signal DS1. As a result, the latch circuit 110 is cleared. The control signal CNTL1 again goes to the low level. The control signal CNTL2 output from the latch circuit 201 remains the high level. The voltage detection system 200 keeps the reset mode.

Since the control signal CNTL1 goes to the low level, the comparison voltage selection circuit 103 again selects the first detection level (reference voltage Vdt1). The comparator 104 monitors whether the power supply voltage VDD1 is higher than the first detection level. The example in FIG. 7 shows that the power supply voltage VDD1 is not restored to the first detection level or higher at time t2. Consequently, the detection signal rises from the low level to the high level at time t3. The mode switching circuit 202 outputs the rise of the detection signal as a reset signal to the CPU 111 and the latch circuit 110. The reset signal resets or initializes the CPU 111 and the system.

In the voltage detection system 200, the power supply voltage VDD1 may not be higher than the first detection level at time t2 after the data save process is complete. In such a case, the mode switching circuit 202 outputs a reset signal at time t3 in accordance with a rise of the detection signal. This takes effect because the latch circuit 201 allows the voltage detection system 200 to maintain the reset mode after time t2.

According to the first embodiment, the latch circuit 110 is cleared when the software process completes system data saving. The interrupt mode is resumed to release the reset mode. The system cannot be reset when the power supply voltage VDD1 remains below the first detection level as shown in FIG. 7 and is not restored to the normal state.

On the other hand, the voltage detection system 200 according to the second embodiment keeps the reset mode and the latch circuit 201 is not cleared even when the data save process is completed and the latch circuit 110 is cleared. When the power supply voltage VDD1 remains below the first detection level at time t2 as shown in FIG. 7, the voltage detection system 200 determines that the power supply voltage VDD1 increases slowly and is unstable. The system can be reset. The second embodiment can improve the system reliability better than the first embodiment.

The present invention is not limited to the above-mentioned embodiments and may be embodied in various modifications without departing from the spirit and scope of the invention. According to the second embodiment, the mode switching circuit 202 outputs a reset signal in immediate response to the detection signal that rises to the high level during the reset mode. Further, for example, the mode switching circuit 202 may be supplied with the detection signal and then may output the reset signal after a specified delay.

Figure 8:
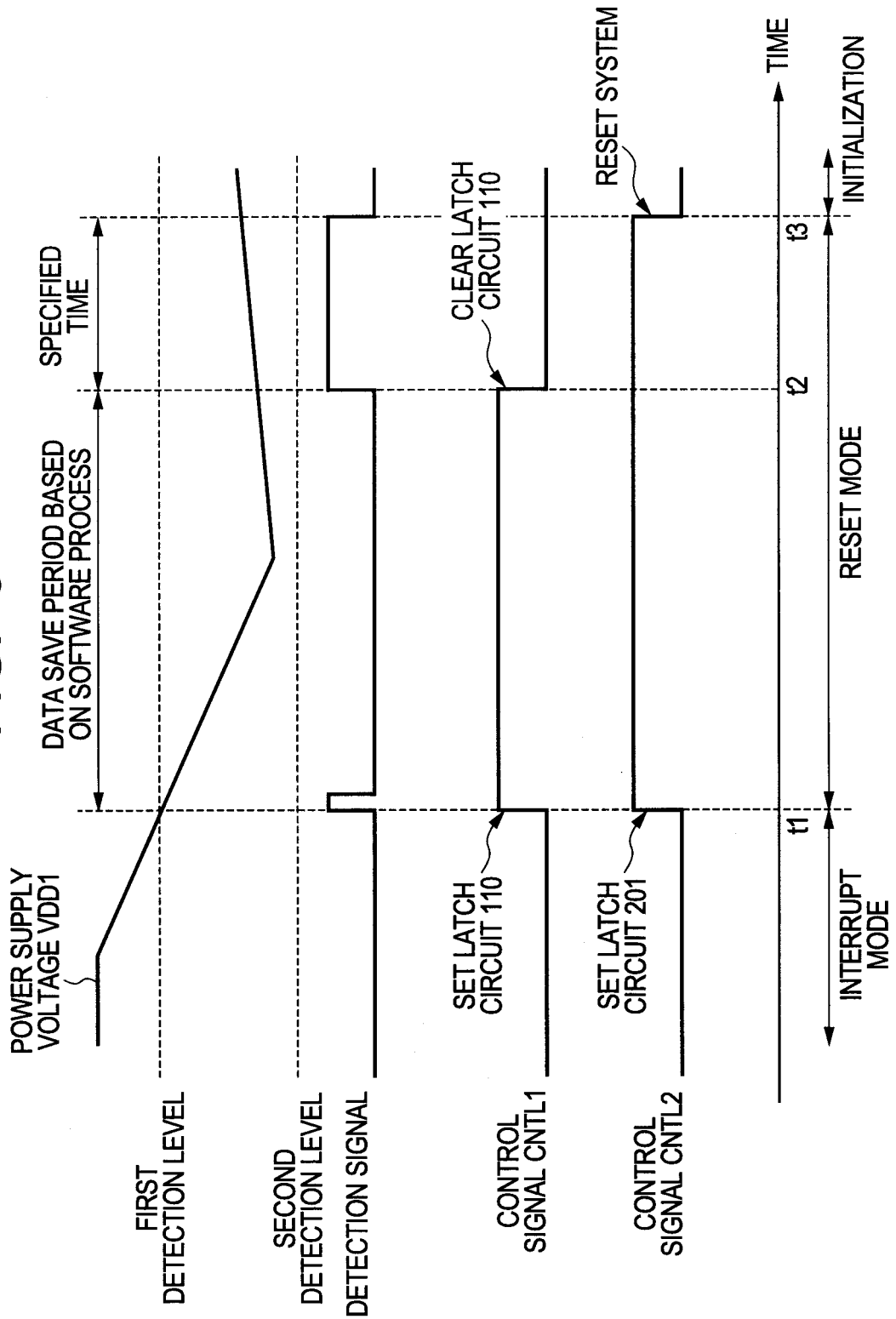
FIG. 8 is a timing chart showing operations of the voltage detection system according to the second embodiment of the invention.

In this case, as shown in FIG. 8, the mode switching circuit 202 outputs the reset signal at time t3 after a specified period passed since time t2 to reset the system.

Figure 9:
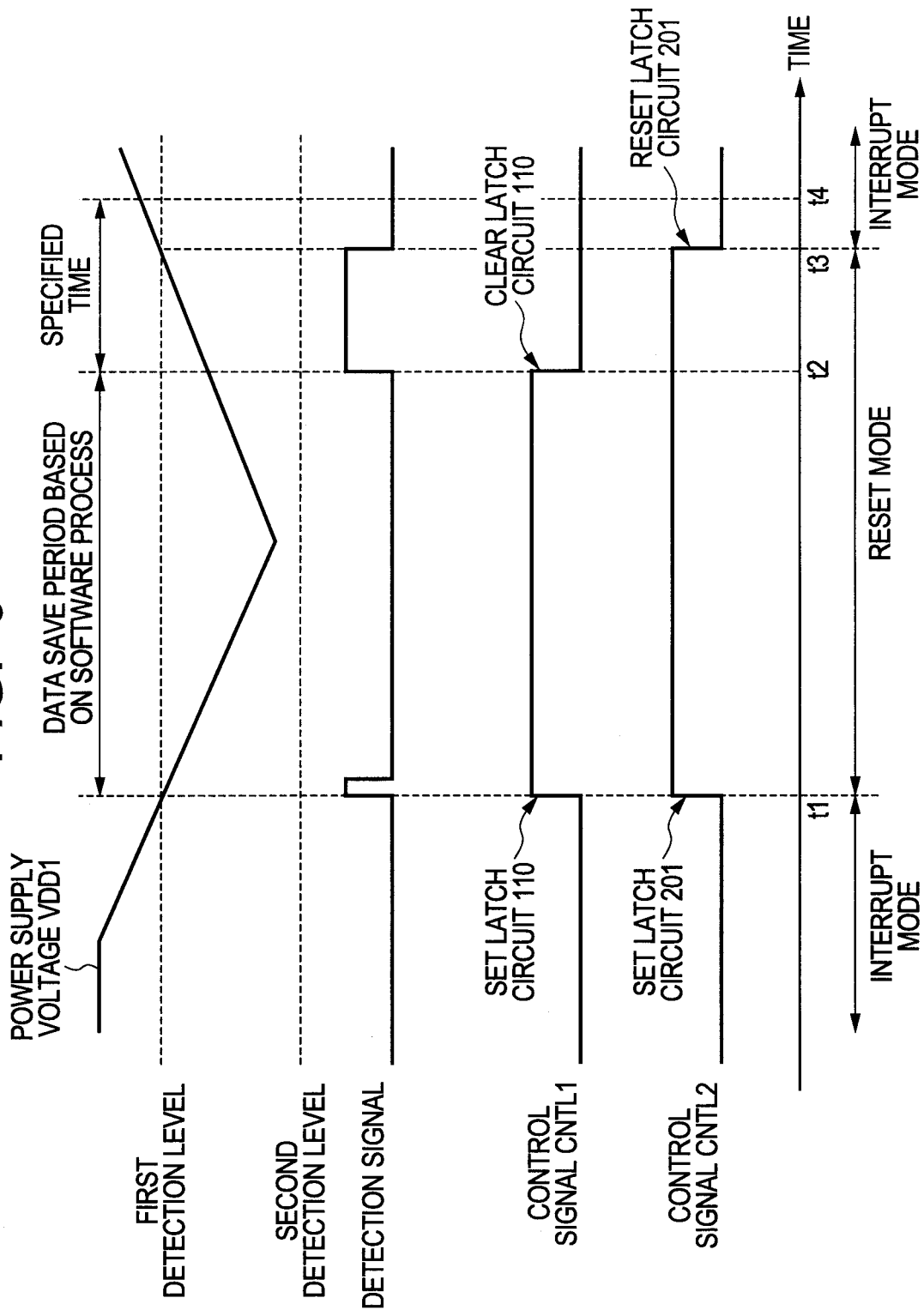
FIG. 9 is a timing chart showing operations of the voltage detection system according to the second embodiment of the invention.
Figure 10:
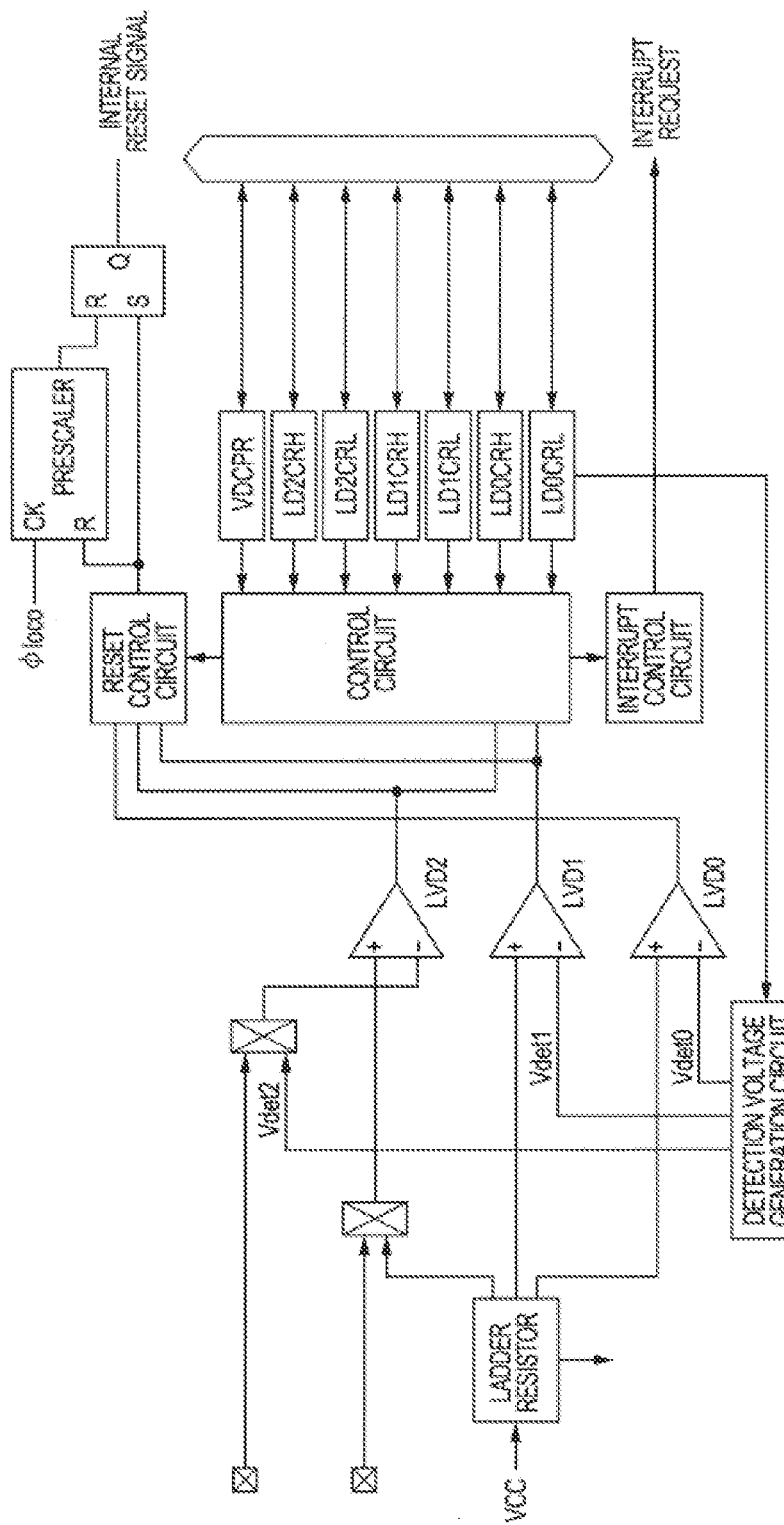
FIG. 10 is a block diagram showing a voltage detection circuit of a related art.

In FIG. 9, on the other hand, the power supply voltage VDD1 becomes higher than the first detection level during the specified period. In this case, the mode switching circuit 202 detects a fall of the detection signal to the low level during the specified period and stops outputting the reset signal. The CPU 111 detects the fall of the detection signal to the low level during the specified period and transmits a reset signal to the latch circuit 201. The latch circuit 201 is then reset. The control signal CNTL2 goes to the low level. The mode switching circuit 202 becomes ready for outputting an interrupt signal in accordance with the detection signal. Namely, the voltage detection system 200 again enters the interrupt mode and returns to the state before time t1.

When the mode switching circuit 202 operates as mentioned above, it may contain a delay circuit. The detection signal may be issued to the delay circuit when the control signal CNTL1 is set to the low level and the control signal CNTL2 is set to the high level. The delay circuit may output the detection signal as a reset signal.

The mode switching circuit 202 may also contain a counter that keeps track of the specified period for the high-level detection signal. The reset signal may be output after the specified period that satisfies the counter.

The above-mentioned configuration can ensure a given period for awaiting a voltage increase without immediately resetting the system even when the power supply voltage VDD1 is lower than the detection level after the data save process.

What is claimed is:

1. A voltage detection system comprising:
a comparison voltage generation circuit that outputs a first comparison voltage and a second comparison voltage;
a latch circuit that outputs a control signal;
a comparison voltage selection circuit that is input by both the first and second comparison voltage, and outputs either the first comparison voltage or the second comparison voltage as a detection level;
a comparator that outputs a detection signal based on the detection level and a third comparison voltage; and
a control circuit that outputs a fourth signal based on the control signal and the detection signal,
wherein the latch circuit determines whether the control signal is a low level or a high level.

2. The voltage detection system according to claim 1, wherein the comparison voltage selection circuit outputs the first comparison voltage when the control signal indicates a low level, and outputs the second comparison voltage when the control signal indicates a high level.

3. The voltage detection system according to claim 1, wherein the comparator sets the low level to the detection signal when the third comparison voltage is larger than the detection signal, and sets the high level to the detection signal when the third comparison voltage is smaller than the detection level.

4. The voltage detection system according to claim 1, further comprising:
an interrupt control circuit that outputs the detection signal as an interrupt signal when the control signal indicates the low level; and
a reset control circuit that outputs the detection signal as a reset signal when the control signal indicates the high level.

5. The voltage detection system according to claim 1, wherein the control circuit further comprises:
a data selection circuit that selects the high level data signal when the control signal indicates the low level, and selects the data signal input from the CPU when the control signal indicates the high level.

6. The voltage detection system according to claim 1, wherein a clock selection circuit is input by the interrupt signal and a clock signal, the control circuit selects the interrupt signal when the control signal is low level, and the control circuit selects the clock signal when the control signal is high level.

7. The voltage detection system according to claim 1, wherein the latch circuit is a flip-flop circuit, and wherein the latch circuit latches the value of the data signal input to a data input terminal based on the rise of the signal input to a clock input terminal, and the latch circuit outputs the latched value as the control signal.

* * * * *